United States Patent [19]
Johnson et al.

[11] Patent Number: 5,432,849
[45] Date of Patent: Jul. 11, 1995

[54] SECURE CRYPTOGRAPHIC OPERATIONS USING CONTROL VECTORS GENERATED INSIDE A CRYPTOGRAPHIC FACILITY

[75] Inventors: Donald B. Johnson; An V. Le; Stephen M. Matyas, all of Manassas; Rostislaw Prymak, Dumfries; John D. Wilkins, Somerville, all of Va.

[73] Assignee: International Business Machines Corporation, Armonk, N.Y.

[21] Appl. No.: 103,953

[22] Filed: Aug. 10, 1993

Related U.S. Application Data

[63] Continuation of Ser. No. 574,012, Aug. 22, 1990, abandoned.

[51] Int. Cl.6 .............................................. H04L 9/00
[52] U.S. Cl. .................................... 380/21; 380/4; 380/9; 380/23; 380/25; 380/49
[58] Field of Search ...................... 380/4, 9, 21, 23, 25, 380/30, 43, 49; 395/375, 800

[56] References Cited

U.S. PATENT DOCUMENTS

| | | | |
|---|---|---|---|
| 4,850,017 | 7/1989 | Matyas et al. | 380/21 |
| 4,918,728 | 4/1990 | Matyas et al. | 380/21 |
| 4,924,514 | 5/1990 | Matyas et al. | 380/24 |
| 4,924,515 | 5/1990 | Matyas et al. | 380/25 |
| 4,941,176 | 7/1990 | Matyas et al. | 380/21 |
| 4,993,069 | 2/1991 | Matyas et al. | 380/23 |
| 5,007,089 | 4/1991 | Matyas et al. | 380/49 |
| 5,103,478 | 4/1992 | Matyas et al. | 380/25 |

Primary Examiner—Bernarr E. Gregory
Attorney, Agent, or Firm—William A. Kinnaman

[57] ABSTRACT

The invention described herein suggests methods of cryptographic key management based on control vectors in which the control vectors are generated or derived internal to a cryptographic facility implementing a set of cryptographic operations. The methods of alternate control vector enforcement described in the present application provide a high-integrity facility to ensure that cryptographic keys are used in a manner consistent with the type and usage attributes assigned to the keys by the originator of those keys. Since the control vectors are generated or derived internal to the cryptographic facility on the basis of data contained in each cryptographic service request to the cryptographic facility, control vectors need not be stored or managed outside the cryptographic facility.

14 Claims, 15 Drawing Sheets

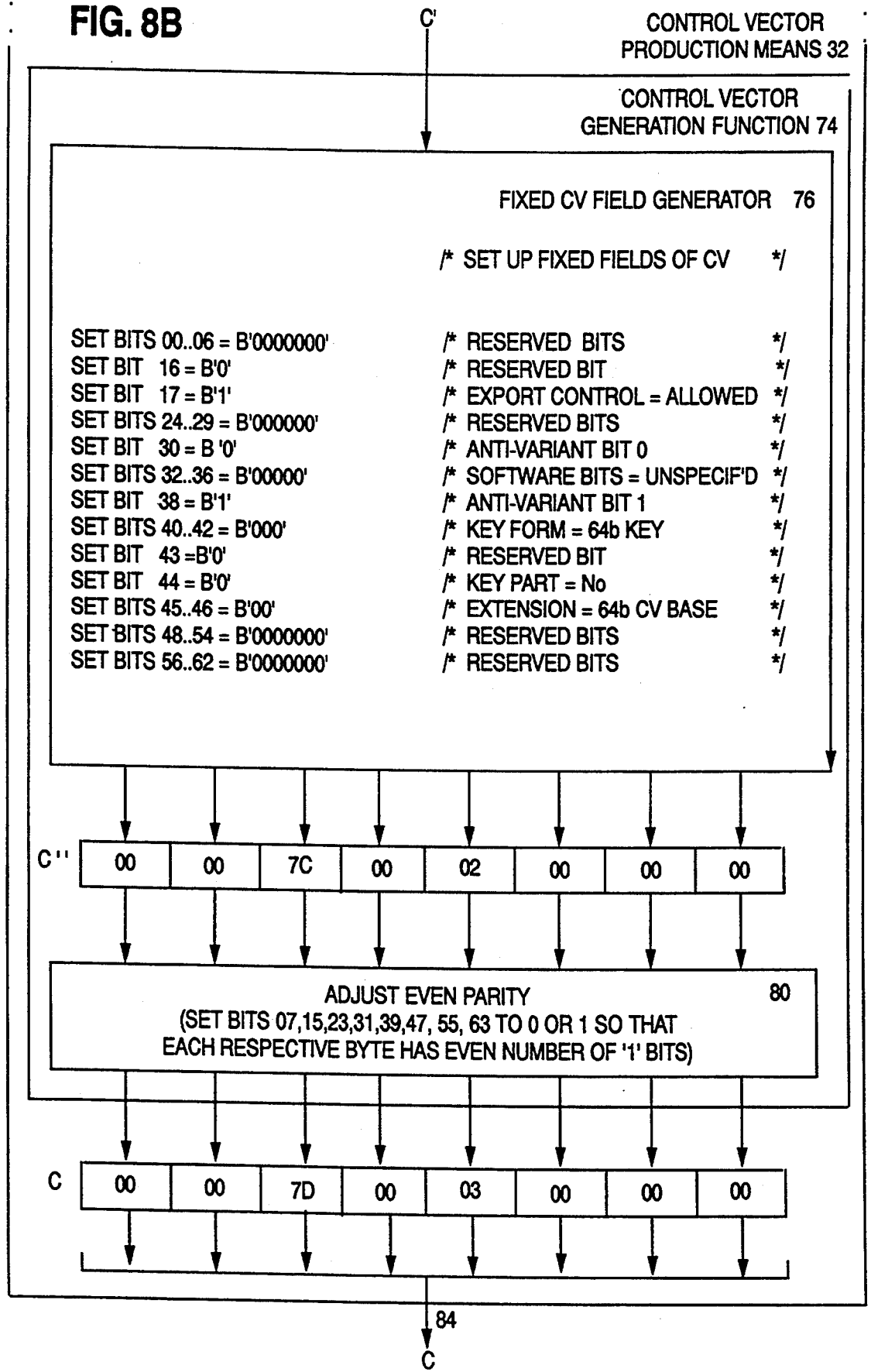

SECURE CRYPTOGRAPHIC OPERATIONS USING CONTROL VECTORS GENERATED INSIDE A CRYPTOGRAPHIC FACILITY

This is a continuation of application Ser. No. 07/574,012, filed Aug. 22, 1990, now abandoned.

BACKGROUND OF THE INVENTION

1. Technical Field

The invention disclosed broadly relates to data processing systems and methods and more particularly relates to cryptographic systems and methods for use in data processing systems to enhance security.

2. Background Art

The above referenced co-pending patent applications, which are incorporated herein by reference, describe a cryptographic architecture for validating that key management functions requested for a cryptographic key in a data processing system have been authorized by the originator of the key. The above referenced co-pending patent applications describe a method of key usage validation based on control vector checking. A control vector is a data structure comprising one or more fields of predefined values which collectively describe the intended usage of a cryptographic key with which it is associated. The control vector is specified by the key originator at key creation time. The referenced co-pending patent applications further describe methods of coupling the control vector to the key value with integrity to ensure that the assigned usage may be enforced by the key usage validation mechanism of the cryptographic architecture.

Control vector checking is a method of key usage validation in which control vectors are passed to a control vector checking unit within the physically secure cryptographic facility along with an operation code indicating the requested key management function to be performed. The control vector checking unit uses a set of checking rules to test and compare the contents of various fields within each passed control vector. If the control vectors satisfy the checking rules associated with the requested key management function, the control vector checking unit transmits a positive authorization signal to the instruction processor within the cryptographic facility which enables completion of the requested key management function. If one or more control vectors fail to satisfy the checking rules, a negative authorization signal is transmitted, and instruction execution is aborted.

The referenced co-pending patent applications describe various methods of establishing the control vector checking rules: static rules which are hard-wired or hard-coded into each executable instruction of the cryptographic facility, parametric rules which permit users or implementers to augment a base set of checking rules using control vector translation, and programmable checking rules which permit the checking criteria to be securely and dynamically loaded into the control vector checking unit from a repository which is external to the cryptographic facility.

The attentive reader will note that all methods of key usage validation are based on enforcing the usage attributes which were defined in the control vector associated with a cryptographic key by the key originator. Collectively, these methods of key usage validation are known as Control Vector (CV) enforcement. The characteristic which is common to all of the above-referenced CV enforcement methods is the notion of CV checking, i.e., applying a set of checking rules to the various predefined fields and values of one or more control vectors passed from the user to the cryptographic facility.

The CV checking method of CV enforcement requires the user to manage CVs outside the cryptographic facility. CV management is the collective term for the definition, distribution, and storage of control vectors. For example, the CV checking method of CV enforcement requires the user of a cryptographic facility to maintain a copy of the key originator's CV, since the CV must accompany its associated key whenever the key is passed to the cryptographic facility for processing a key management request. (The CV is necessary both to validate the requested usage of the key and to properly recover the plaintext form of the key.) The CV checking method further requires the user to define the entire contents of each CV before creating or processing encrypted keys. The user must also distribute the CV along with the encrypted key when the key is exported to other systems.

RELATED PATENT APPLICATIONS

The following co-pending patent applications are related to the present patent application and are incorporated herein by reference.

B. Brachtl, et al., "Controlled Use of Cryptographic Keys Via Generating Stations Established Control Values," Ser. No. 55,502, filed May 29, 1987, and assigned to the IBM Corporation, now U.S. Pat. No. 4,850,017.

S. M. Matyas, et al., "Secure Management of Keys Using Control Vectors," Ser. No. 231,114, filed Aug. 11, 1988, assigned to the IBM Corporation, now U.S. Pat. No. 4,941,126.

S. M. Matyas, et al., "Data Cryptography Operations Using Control Vectors," Ser. No. 401,486, filed Aug. 30, 1989, assigned to the IBM Corporation, now U.S. Pat. No. 4,918,728.

S. M. Matyas, et al., "Personal Identification Number Processing Using Control Vectors," Ser. No. 398,300, filed Aug. 24, 1989, assigned to the IBM Corporation, now U.S. Pat. No. 4,924,514.

S. M. Matyas, et al., "Secure Management of Keys Using Extended Control Vectors," Ser. No. 398,299, filed Aug. 24, 1989, assigned to the IBM Corporation, now U.S. Pat. No. 4,924,515.

S. M. Matyas, et al., "Secure Management of Keys Using Control Vectors With Multi-Path Checking," Ser. No. 344,165, filed Apr. 27, 1989, assigned to the IBM Corporation, now abandoned.

S. M. Matyas, et al., "Secure Key Management Using Control Vector Translation," Ser. No. 443,418, filed Nov. 29, 1989, assigned to the IBM Corporation, now U.S. Pat. No. 4,993,069.

S. M. Matyas, et al., "Secure Key Management Using Programmable Control Vector Checking," Ser. No. 506,319, filed Apr. 9, 1990, assigned to the IBM Corporation, now U.S. Pat. No. 5,007,089.

OBJECTS OF THE INVENTION

It is therefore an object of the invention to provide a secure method for control vector enforcement which reduces or eliminates the need for CV management outside the cryptographic facility.

It is another object of the invention to eliminate the storage of CVs outside the cryptographic facility.

It is another object of the invention to provide a secure method for control vector enforcement which permits the validation and recovery of a cryptographic key when the explicit control vector value with which it is coupled is unknown.

It is still another object of the invention to provide a secure method for control vector enforcement in which control vectors may be derived internally from input information passed to the cryptographic facility.

It is another object of the invention to provide a secure method for control vector enforcement in which control vectors are selected from storage within the cryptographic facility on the basis of an index which is derived outside the cryptographic facility.

SUMMARY OF THE INVENTION

These and other objects, features, and advantages are accomplished by the secure cryptographic operations invention using alternate modes of control vector enforcement. The invention describes various methods of generating, selecting, or deriving control vectors on the basis of data contained in the cryptographic service request passed to the cryptographic facility. Since the process of control vector generation, derivation, or selection is performed within the secure boundary of the cryptographic facility, the underlying control vector enforcement is performed with high integrity.

The reader will appreciate that a number of advantages may be gained by transferring some or all of the CV management responsibilities to the cryptographic facility itself. The present invention provides alternative modes of CV enforcement that permit CVs to be generated or acquired internal to the cryptographic facility based on input information supplied to the cryptographic facility. Some of the advantages include:

enhanced reliability (integrity of CVs maintained by cryptographic facility).

improved useability (simpler instruction interfaces).

reduced storage (fewer CVs stored external to cryptographic facility).

The present invention also provides a mode of CV enforcement that permits CV management responsibilities to be shared by the user and the cryptographic facility. This mode has the feature that variable portions of the CV may be specified by the user for those usage attributes with the broadest range of acceptable values. However, fixed portions of the CV are specified by the cryptographic facility on the basis of the requested operation and other input information for those usage attributes whose range is limited to a set of predefined values.

Alternative modes of CV enforcement provided by the present invention are particularly applicable to cryptographic implementations in which the set of defined key types and usages is limited and well-defined. Use of these modes in such systems reduces the complexity of implementing and testing the CV enforcement mechanism within the cryptographic facility.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figure 1:
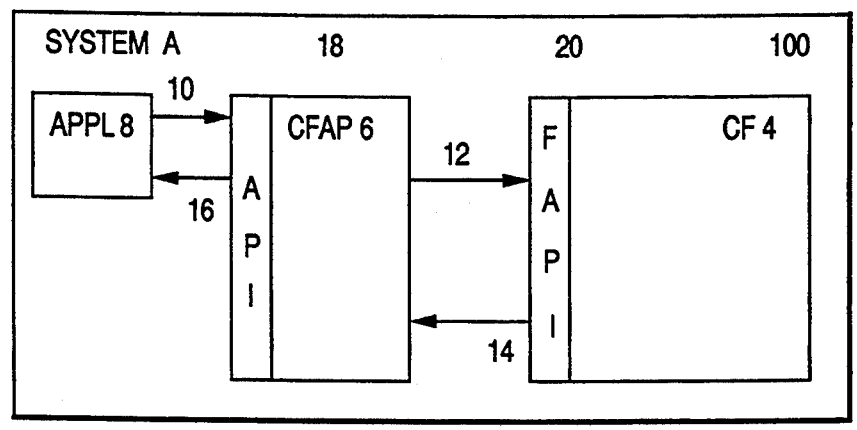
FIG. 1 is a block diagram illustrating the major components of a cryptographic system.

FIG. 1 illustrates a cryptographic system A 100 comprising one or more application programs (APPL) 8, a Cryptographic Facility Access Program (CFAP) 6, and a Cryptographic Facility (CF) 4. The APPL 8 issue requests for cryptographic services from the CFAP 6 via an input channel 10 of the Application Programming Interface (API) 18. The CFAP 6, in turn, invokes one or more instructions of the CF 4 via an input channel 12 of the Facility Access Program Interface (FAPI) 20. The CF 4 executes each invoked instruction and returns the processing results to the CFAP 6 via output channel 14 of the FAPI 20. Finally CFAP 6 returns the results, or some function of the results, of a set of instruction invocations to APPL 8 via an output channel 16 of the API 18.

A more detailed description of the components and interfaces between components in a cryptographic system is provided in the above-referenced co-pending patent applications. However, some discussion of the functions of the CFAP 6, the CF 4, and the FAPI 20 interfaces should aid the reader in appreciating the objectives of the present invention.

The CF 4 supports a set of one or more cryptographic instructions which may be invoked externally via a set of input information passed to the CF 4 by the input channel 12 of the FAPI 20. The input information may include a cryptographic service request in the form of an operation code, clear and/or encrypted key parameters, plaintext or ciphertext data, etc. The operation code, or opcode, selects which of the set of distinct cryptographic instructions is to be performed by the CF 4. The remainder of the input information is either control or data parameters used in the cryptographic processing identified by the opcode. The reader will appreciate that the input information may take the form of a structured control block with predefined fields and values identifying the opcode and data parameters, or the input information may be conveyed as individual data items via the input channel 12 until the CF 4 has received all the input information required to execute the instruction selected by the cryptographic service request.

The CF 4 uses the input information to transform the input information received on input channel 12 of the FAPI 20 to a set of output information which is returned on output channel 14 of the FAPI 20. Execution of the instructions occurs entirely within the physically secure boundary of the CF 4, thus providing high integrity and secrecy for the cleartext forms of the input encrypted keys and data and other intermediate results.

As described in the above-referenced co-pending patent applications, the CF 4 is responsible for ensuring that each cryptographic key is used in a manner that is consistent with the usage attributes assigned to the key when it was created. Architecturally, the usage attributes are inseparably associated with a key by coupling a structured data value with the key encrypting key under which the subject key is encrypted when stored outside the boundary of the CF 4. The structured data value is known as a Control Vector (CV) which contains a set of fields of pre-specified values which correspond to the usage attributes defined at key creation time. The mechanism used by the CF 4 to ensure that the CV (i.e., usage attributes) of a key to be processed inside the CF 4 is valid with respect to the requested instruction is known as CV Enforcement.

The above-referenced co-pending patent applications describe a method of CV Enforcement known as Control Vector Checking. In Control Vector Checking the CF 4 uses a fixed, variable, or parameterized set of rules stored within the CF 4 to test the various fields within each CV passed to the CF 4 in the input information block. If the contents of the passed CVs satisfy the checking rules associated with the requested cryptographic instruction, the CF 4 permits the requested cryptographic transformation to occur. If one or more of the passed CVs do not satisfy the checking rules, the instruction is aborted. Since each CV is tightly coupled to its associated key, and a key cannot be recovered internal to the CF 4 without specifying the correct CV under which the key was created, no opportunity is provided for an attacker to present an alternate CV to the CF 4 which would both satisfy the CV checking rules AND result in proper internal recovery of the encrypted key.

The present invention describes alternate modes of CV enforcement in which the values of the control vectors associated with key parameters are not passed from the CFAP 6 to the CF 4, but rather are computed internally by the CF 4 on the basis of the contents of the input information passed in each instruction invocation. These methods have the advantage that part or perhaps all of the CVs need not be stored outside the CF 4 and passed across the FAPI 20 interface since the missing CVs or CV parts are derived internal to the CF 4.

Figure 2:
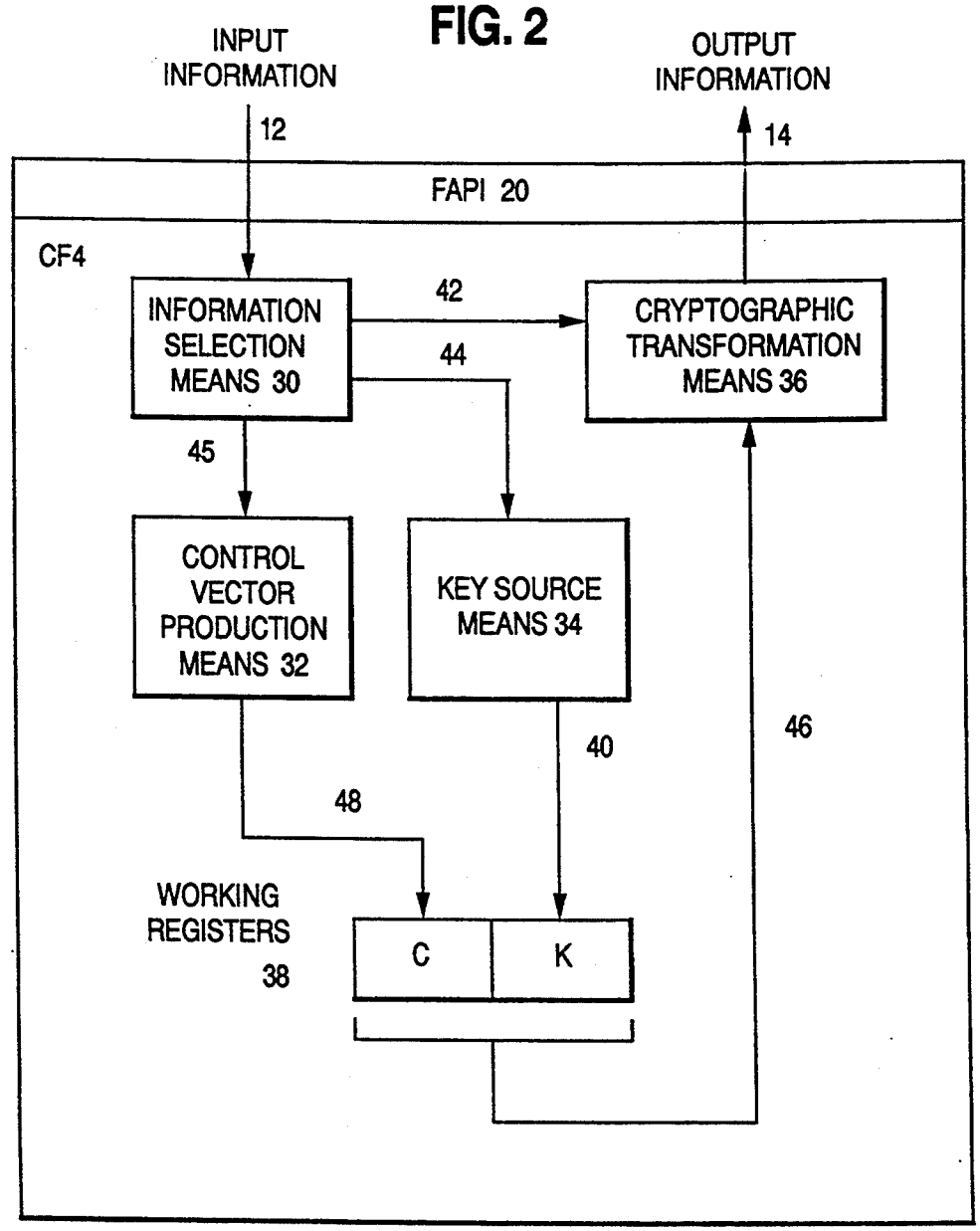
FIG. 2 is a block diagram illustrating the logical components of a cryptographic facility. A Control Vector Production Means and Key Source Means produce a single control vector C and cryptographic key K, respectively, based on input information supplied to the cryptographic facility. The Control Vector Production Means implements one or more of the alternate modes of CV enforcement.

FIG. 2 illustrates the components of a CF 4 in which the present invention may be implemented. As described in FIG. 1, input information is passed to the CF 4 via an input channel 12 of the FAPI 20. The FAPI 20 may be a "pass-through" interface, or it may perform format and type conversion functions necessary to transform the input information into a form that is acceptable to the internal components of the CF 4. Likewise, the output information which represents the results of processing a cryptographic service request is returned by the CF 4 via output channel 14 of the FAPI 20. Here, the FAPI may perform data format and type conversion functions necessary to transform the output information into a form that is acceptable to the calling facility access program (e.g., CFAP 6 in FIG. 1).

Internally, the CF 4 comprises an Information Selection Means 30, a Control Vector Production Means 32, a Key Source Means 34, and a Cryptographic Transformation Means 36. The Information Selection Means 30 accepts the input information from input channel 12. The input information consists of an operation code (opcode) or token value which selects one of a multiplicity of instructions in the CF 4 instruction repertoire which are implemented in the Cryptographic Transformation Means 36. Furthermore, the input information may contain one or more of the following:

plaintext or ciphertext data to be processed clear (i.e., plaintext) cryptographic keys encrypted cryptographic keys, i.e., each plaintext key being encrypted under a key-encrypting key which is a function (e.g., exclusive-OR) of a system master key (or another key-encrypting key) and a control vector which defines the type and usage attributes of the encrypted key
control vector selection parameters
other process-specific parameters.

The Information Selection Means 30 routes the various parameters contained within the input information to the other CF 4 components as needed.. The parameter selection and routing may be based on the opcode alone, or on the opcode and other process-specific parameters such as a mode selector which further defines processing options within a given opcode.

Figure 3:
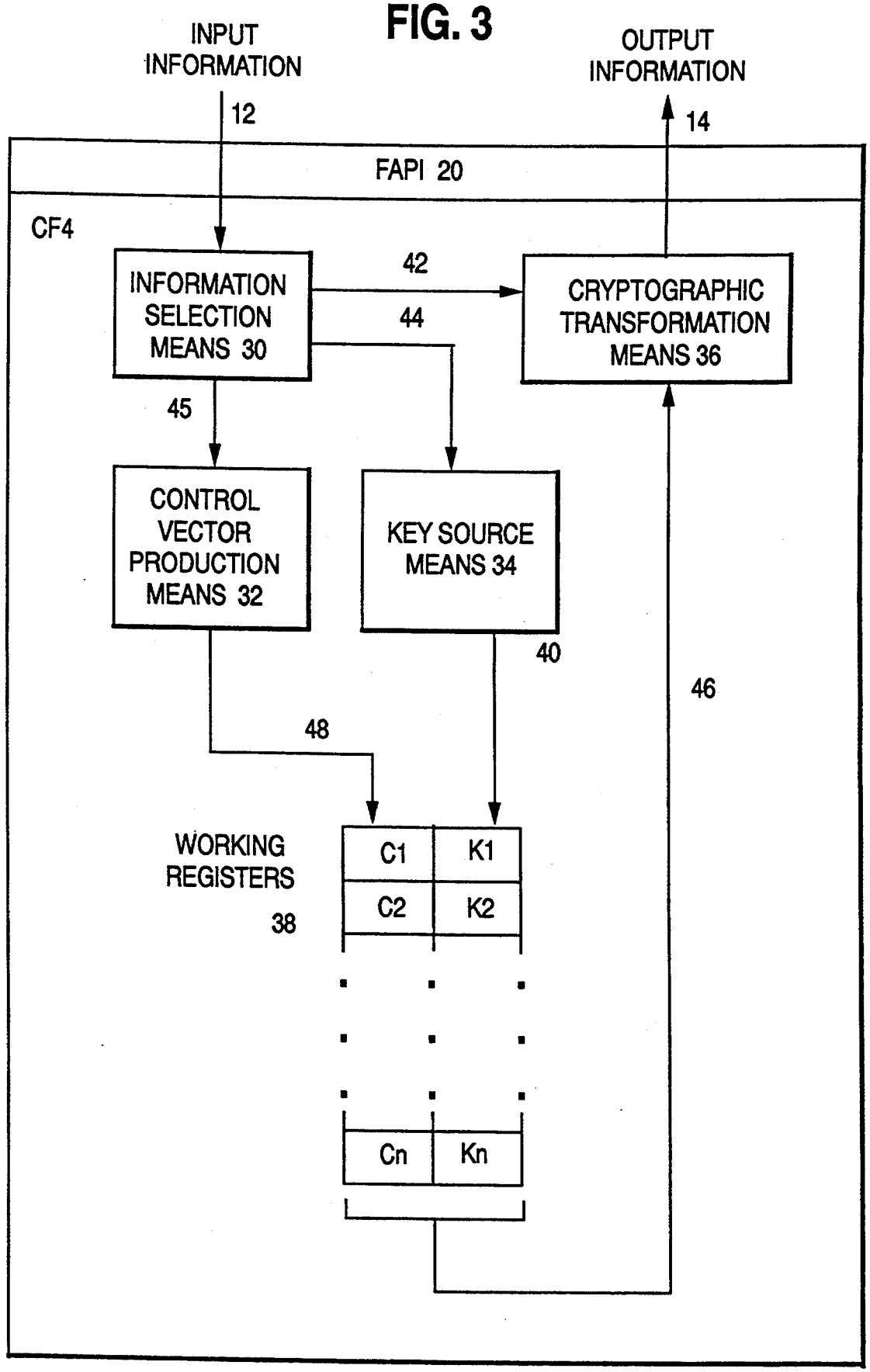
FIG. 3 is a block diagram in which the Control Vector Production Means and Key Source Means are extended to produce a multiplicity of control vector-cryptographic key pairs (C,K) from input information supplied to the cryptographic facility.

The Control Vector Production Means 32 is responsible for generating or deriving a control vector C to be used by the Cryptographic Transformation Means 36 to process a cryptographic key K with which the control vector C is associated. The Control Vector Production Means 32 thus implements the alternate methods of CV enforcement of which the present invention is concerned. The Control Vector Production Means 32 outputs the generated or derived control vector C on output channel 48 for storage in the Working Registers 38. In general, the Control Vector Production Means 32 may generate and output a multiplicity of control vectors in the form of an ordered set C1,C2, . . . ,Cn of control vectors for storage in the Working Registers 38, as illustrated in FIG. 3.

The Key Source Means 34 is responsible for generating or acquiring a cryptographic key value K to be used by the Cryptographic Transformation Means 36. The Key Source Means 34 accepts selected input information including the instruction opcode and other parameters and outputs a cryptographic key value K via output channel 40 for storage with its associated control vector C in the Working Registers 38. The output key value K may be randomly generated internal to the Key Source Means 34 or it may be extracted from clear or encrypted key parameters in the selected input information passed from the Information Selection Means 30 via input channel 44. The key value K may represent a clear or encrypted key. For example, if key value K is randomly generated, K may be defined as a random clear key K' which is encrypted under a key formed by the exclusive-OR of the master key KM with control vector C, i.e., K=e*KM.C(K'). In general, the Key Source Means 34 may select and output a multiplicity of key values in the form of an ordered set of clear and encrypted keys K1, . . . ,Kn, as illustrated in FIG. 3. Each of the key values Ki is associated with a corresponding control vector Ci which was output by the Control Vector Production Means 32.

Figure 4:
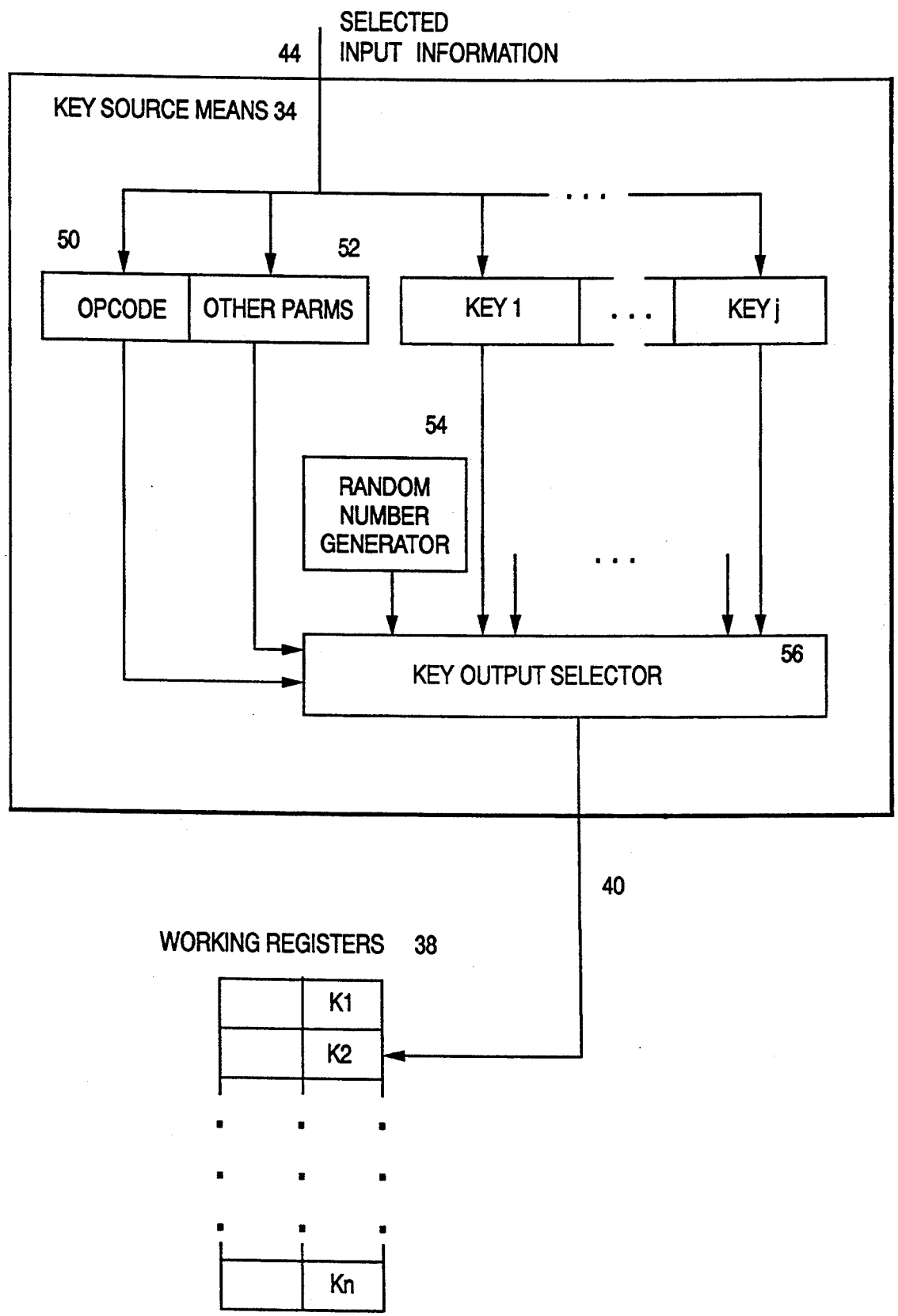
FIG. 4 illustrates the components and data flow within the Key Source Means. The Key Source Means generates random keys or selects keys from selected input information supplied to the cryptographic facility in a cryptographic service request.

FIG. 4 illustrates the components of a Key Source Means 34. A Key Output Selector 56 selects each of the output key values Ki from one of the input clear or encrypted key values Key 1, . . . , Key j contained in the selected input information or from the output of a Random Number Generator 54. The selection process for each key value Ki is based on the instruction opcode 50 and other parameters 52 extracted from the selected input information received on input channel 44 from the Information Selection Means 30 shown in FIG. 3. For example, consider a cryptographic service request (such as Generate Key Set (GKS) with mode OPEX) for which the CF 4 must produce a randomly generated 64-bit key K encrypted under a key-encrypting key formed by exclusive-ORing a 128-bit key-encrypting key KK with a 128-bit control vector C3. KK is stored in the encrypted form e*KM.C1(KKL),e*KM.C2(KKR) where KKL is the left 64 bits of KK and KKR is the right 64 bits of KK. The input information in the cryptographic service request contains the opcode, mode, the encrypted key KK and other information necessary to reconstruct control vectors C1, C2, and C3. The selected input information on input channel 44 to the Key Source Means 34 contains only the opcode, mode, and key parameters e*KM.C1(KKL) and e*KM.C2(KKR). The Key Output Selector 56 uses the opcode 50 and mode 52 to define its output selection criteria: K1 is set to a first 64-bit output K of the Random Number Generator 54; K2 is set to the left 64 bits of the input key-encrypting key, e*KM.C1(KKL); and K3 is set to the right 64 bits of the input key-encrypting key, e*KM.C2(KKR).

Referring once again to FIG. 3, the output of the Control Vector Production Means 32, i.e., the ordered set of control vectors, C1, . . . ,Cn, is coupled with the output of the Key Source Means 34, i.e., the ordered set of n key values, K1, . . . ,Kn, in a set of Working Registers 38. The contents of the Working Registers 38 are passed to the Cryptographic Transformation Means 36 via a data channel 46. The Information Selection Means 30 passes the opcode and other selected input information to the Cryptographic Transformation Means 36 via a data channel 42.

The Cryptographic Transformation Means 36 uses the opcode, selected input information, and the contents of the Working Registers 38 to perform the cryptographic service associated with the passed opcode. The results of the cryptographic processing may be output in the form of output information via the output channel 14 to the invoking cryptographic facility access program (e.g., CFAP 6 shown in FIG. 1). The results may also be stored in storage registers within the CF 4 for use during subsequent instruction invocations. Other cryptographic instructions in the instruction repertoire of the CF 4 may produce no outputs; these instructions may simply alter the processing configuration of the CF 4 (e.g., a Clear Crypto Facility instruction which clears the contents of all internal working registers within the CF 4).

The reader will appreciate that the functions of the Information Selection Means 30 may be incorporated into each of be other major components, i.e., the Control Vector Production Means 32, the Key Source Means 34, or the Cryptographic Transformation Means 36.

As stated above, the Control Vector Production Means 32 implements the alternate methods of CV enforcement. In particular, this invention describes three alternative means of CV enforcement (and some variations of each):
internal CV table lookup
internal CV generation
masking, or "bit fixing".

Figure 5:
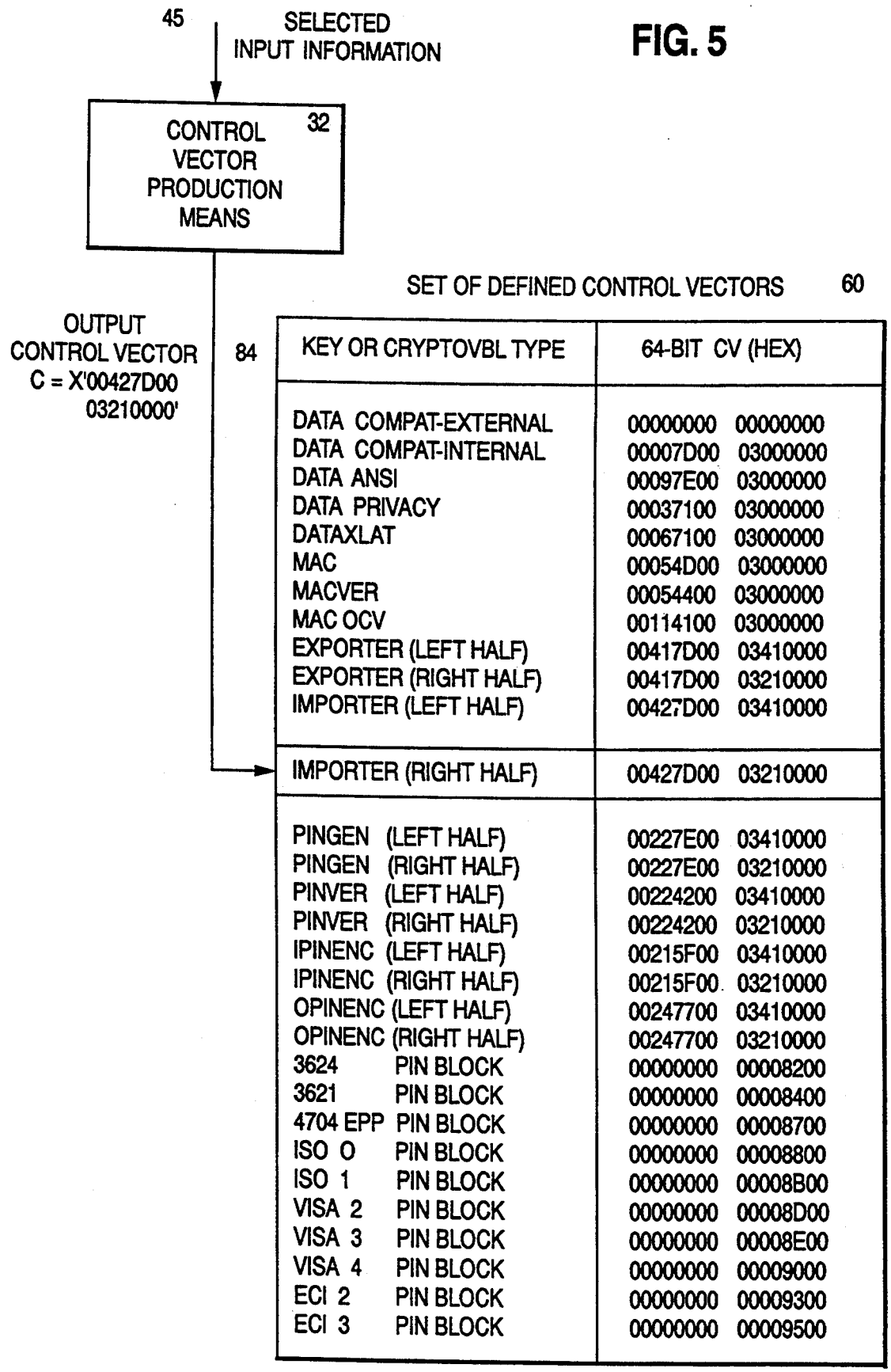
FIG. 5 illustrates a set of control vectors to which the Control Vector Production Means maps the selected input information supplied to the cryptographic facility in a cryptographic service request.
Figure 6:
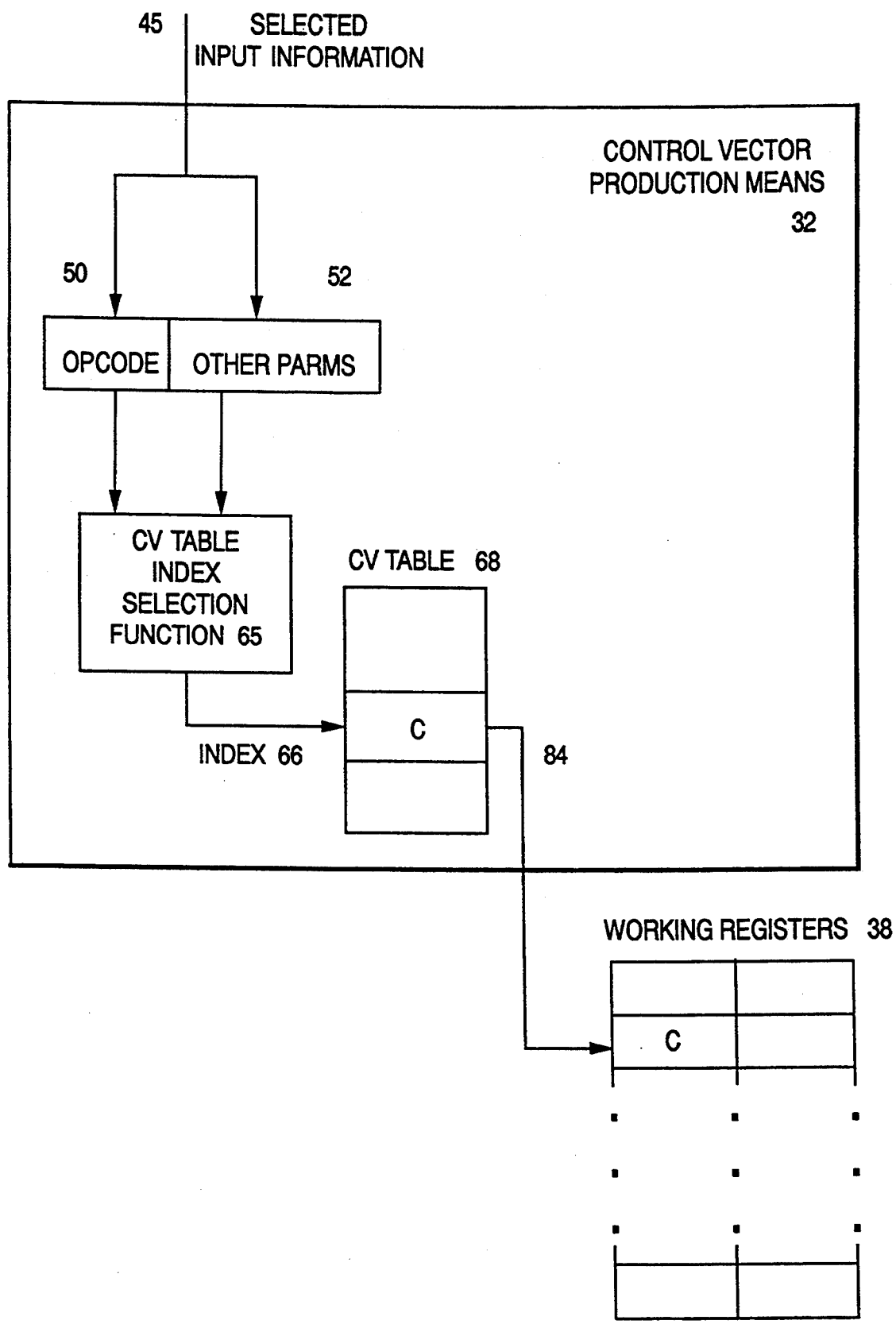
FIG. 6 describes one method of CV enforcement in which the Control Vector Production Means uses the selected input information from a cryptographic service request to compute a table index; the table index points to a control vector value stored in a control vector table within the cryptographic facility. The Control. Vector Production Means thus selects and outputs a control vector from a set of predetermined stored values.

The method of CV enforcement must select with integrity the CV or CVs for each requested cryptographic operation. The set of acceptable control vectors for each cryptographic operation must be defined by and under the control of the physically or logically secure components of the cryptographic facility. Thus a user of the facility has no means to subvert the key type and usage restrictions defined by the implementer and authorized system administrators. FIG. 5 illustrates the role of the Control. Vector Production Means: selecting one or more control vectors 84 from a set of defined CVs 60 on the basis of selected input information from a cryptographic service request to the CF 4. In the example given in FIG. 5, an IMPORTER (right half) CV 84 is selected from the set 60. This CV type might be selected for a Re-encipher To Master Key (RTMK) operation or other operations in which an encrypted key-encrypting receiver key is processed. The set of defined control vectors 60 shown in FIG. 5 is not comprehensive; the values shown represent a generic instance of each CV type. The term generic refers to an instance of a control vector whose control attributes authorize the maximum functionality and impose the minimum restrictions for a given key type and usage. The reader will therefore appreciate that the set of defined control vectors may be extended to include additional instances of each CV type in which functionality is further restricted or in which certain user-definable fields are implemented. FIG. 6 describes one method of CV enforcement in which the CVs required to process a cryptographic service request are selected from a table of CVs stored within the Control Vector Production Means 32. In this method—the "Table Lookup" Method—the Control Vector Production Means 32 accepts selected input information received via an input channel 45 from the Information Selection Means 30. The selected input information contains an opcode 50 which identifies the particular operation (or instruction) to be performed by the cryptographic facility. The opcode 50 and other input parameters 52 are passed to a CV Table Index Selection Function 65. The CV Table Index Selection Function 65 computes an index 66 which points to an entry or ordered set of entries in a predefined table of control vectors, CV Table 68. The selected CV or CVs are output by the Control Vector Production Means 32 for storage in the Working Registers 38. The CV Table Index Selection Function 65 may use a mathematical hashing function to translate the input opcode 50 and other parameters 52 into a selection index 66. Alternatively, the Index Selection Function 65 may use an algorithm (such as a set of "CASE" statements) to compute the index 66. Alternatively, elements of the selection function may exist outside the CF 4; CFAP 6 may compute an index 66 and pass it through the input information to CF 4 where it is simply validated by the CV Table Index Selection Function 65. In this case, the validation process may be a simple algorithm which compares the selected index to a set of valid indices for a given opcode. The Table Lookup Method is characterized by the advantage that, for most instructions, control vectors are not passed across the FAPI 20 interface and, therefore, CVs do not need to be stored or managed by the CF 4 user.

Figure 12:
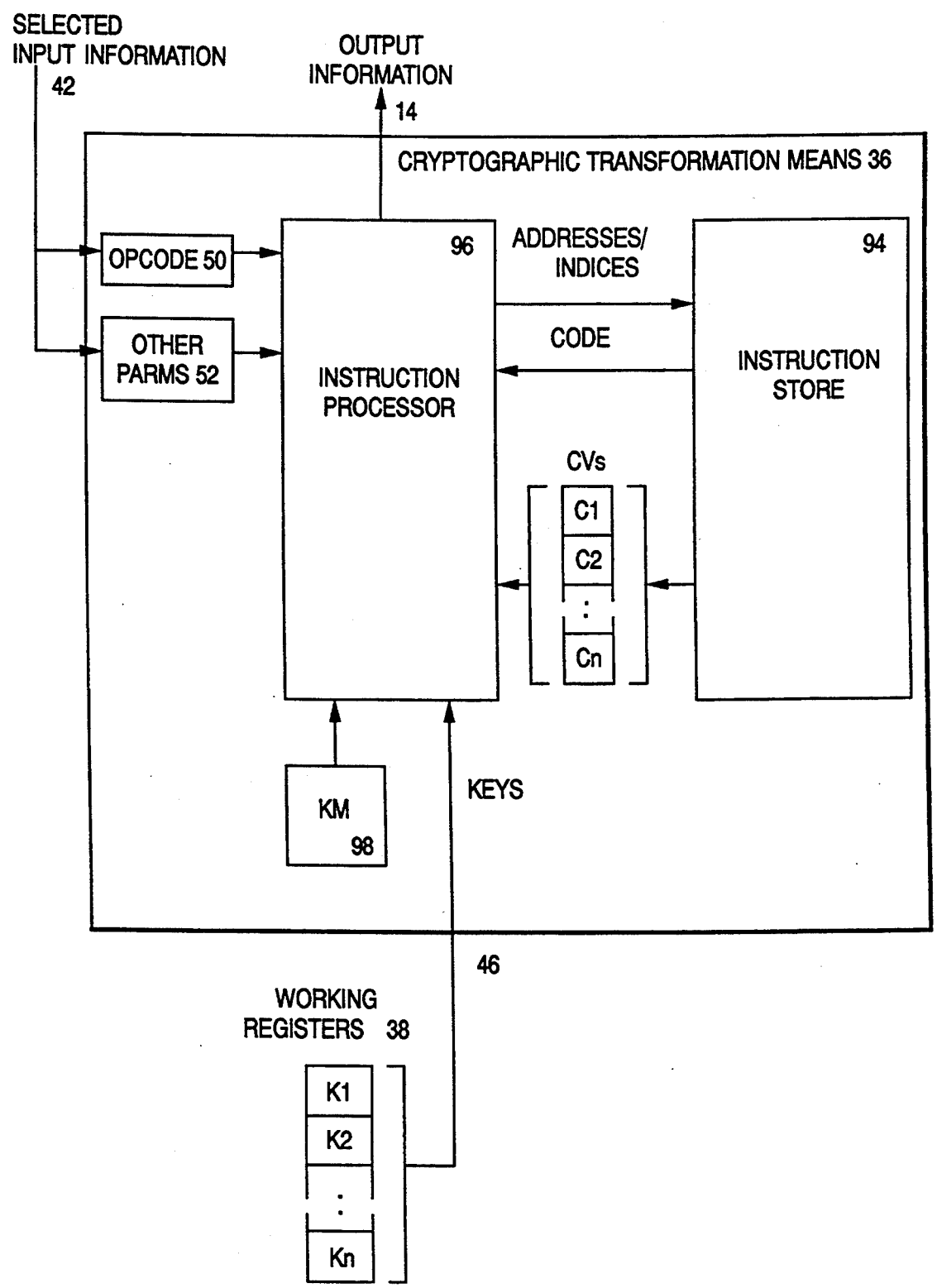
FIG. 12 illustrates a variant of the Table Lookup method of CV enforcement in which one or more control vectors are selected from a set of predetermined values stored in an instruction store which includes a corresponding set of executable code for each cryptographic instruction in the instruction repertoire of the cryptographic facility. The instruction processor of the cryptographic facility thus fetches both executable code and the control vectors necessary to process that code from the same instruction storage facility.

A variation of the Table Lookup Method of CV Enforcement in which the instruction store of the Cryptographic Transformation Means 36 includes a set of applicable control vectors for each defined instruction in the cryptographic facility instruction repertoire is described in FIG. 12.

Figure 7:
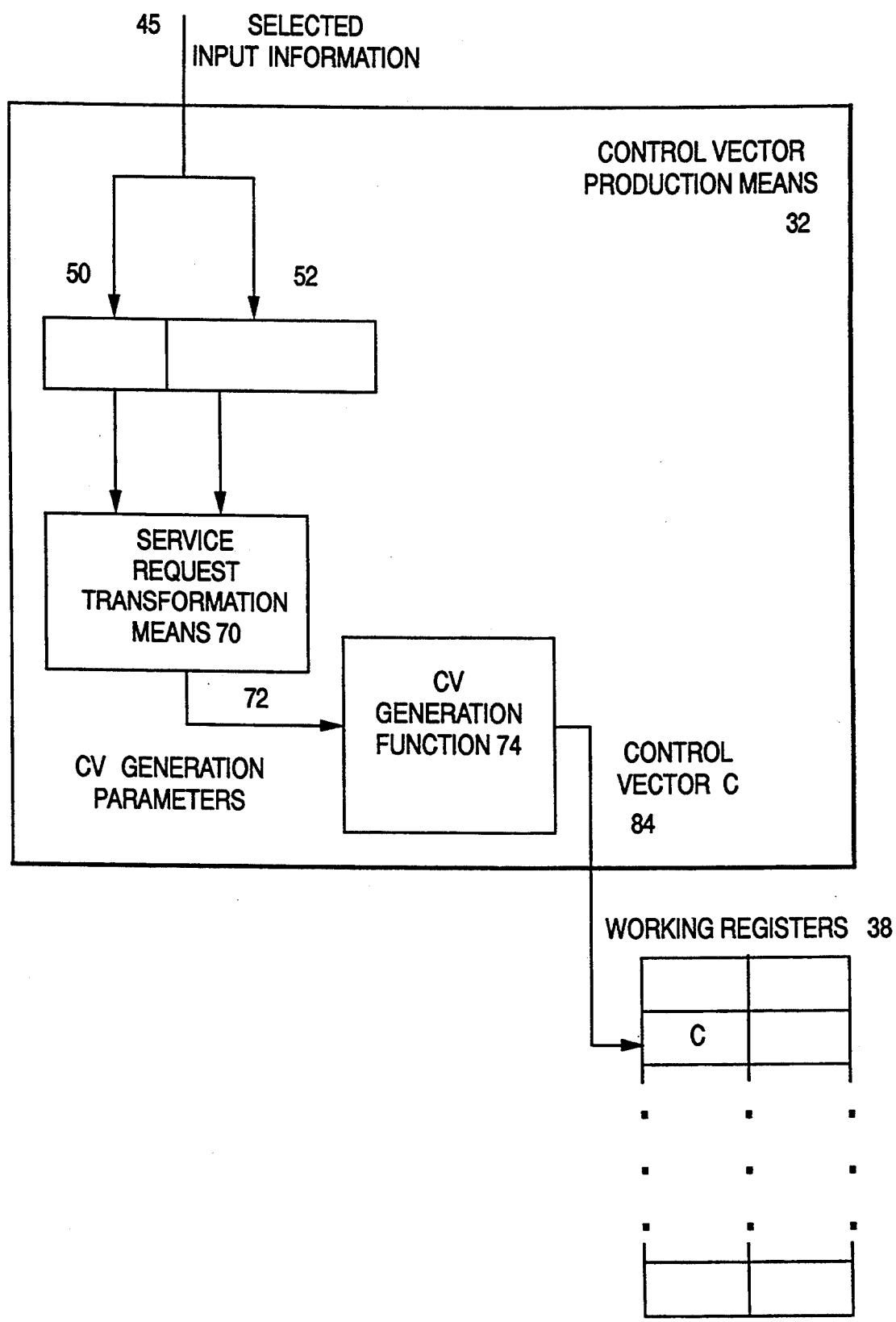
FIG. 7 describes another method of CV enforcement in which the Control Vector Production Means uses the selected input information from a cryptographic service request to dynamically generate a control vector.

FIG. 7 describes another CV enforcement method: the Generation Method. In the Generation Method, the Control Vector Production Means 32 accepts selected input information received via an input channel 45 from the Information Selection Means 30. The selected input information contains an opcode 50 which identifies the particular operation (i.e., instruction) to be performed by the cryptographic facility. The opcode 50 and other input parameters 52 are passed to a Service Request Transformation Means 70. The Service Request Transformation Means 70 uses the opcode 50 and other parameters 52 to generate a set of CV Generation parameters 72 which are passed to the CV Generation Function 74. The CV Generation Function 74 uses these Generation parameters to construct a CV or ordered set of CVs for output on output channel 48 to the Working Registers 38.

The Service Request Transformation Means 70 may use tables or an algorithmic means to translate the opcode 50 and other input parameters 52 into the CV Generation parameters 72. The Generation parameters 72 may consist of a parameterized, high-level list of CV field names and corresponding values; for example:

USAGE=E,D,MG,MV
EXPORT=NO
KEY_FORM=64LEFT
KEY_PART=NO

The CV Generation Function 74 may interpret such a list, converting each of the field-value keyword pairs into specific CV field locations and binary encodings on the basis of some predetermined semantics associated with each defined pair.

Alternatively, the Service Request Transformation Means 70 may simply construct a skeletal CV on the basis of the opcode 50 and other input parameters; 52 provided in the cryptographic service request. The Transformation Means 70 may thus initialize a limited subset of the CV fields whose value is dependent on input parameters. The remaining, independent fields of the skeletal CV may be initialized by the CV Generation Function 74. Such independent CV fields may contain reserved fields (initialized to zero), fields whose location and value are fixed regardless of CV type (such as the anti-variant bits), and other implementation constants (such as the extension field).

The reader will appreciate that the parameter-dependent functions of the Service Request Transformation Means 70 and the parameter-independent functions of the CV Generation Function 74 may be combined in a single component within the Control Vector Production Means 32. Furthermore, the input parameters 52 may include operation mode parameters (e.g., a parameter MODE='COMPAT' which further restricts an ENCIPHER request to use a DATA COMPAT-INTERNAL key, rather than a default DATA PRIVACY key). The input parameters 52 may also include skeletal or complete CVs from which the Control Vector Production Means 32 may derive related CVs for storage in the Working Registers 38 for subsequent cryptographic transformation in the Cryptographic Transformation Means 36.

Figure 8A:
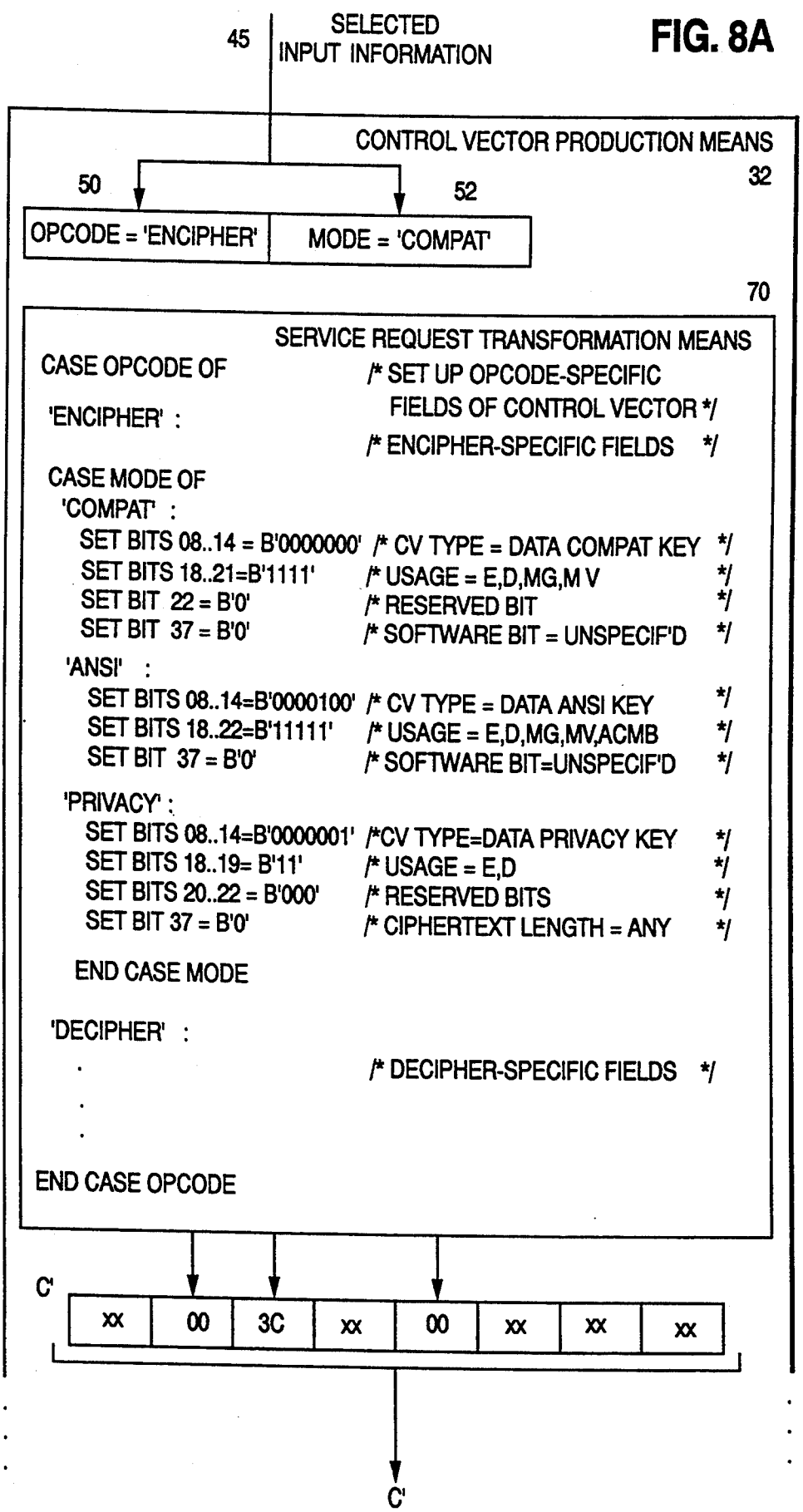
FIG. 8 gives an example of the method of CV generation described in FIG. 7. In the example, a DATA COMPAT-INTERNAL control vector is generated based on an input operation code and operation mode parameter supplied to the cryptographic facility in selected input information within a cryptographic service request.

FIG. 8 illustrates an example of the Generation Method of CV Enforcement as implemented in the Control Vector Production Means 32. In this example the opcode 50 contains an ENCIPHER service request; the other input parameters 52 contains a COMPAT mode restriction. The objective of the Control Vector Production Means 32 is to generate a control vector C which may be used by the Cryptographic Transformation Means 36 to internally recover a DATA COMPAT-INTERNAL key K which is passed to the CF 4 in encrypted form e*KM.C(K). Once recovered, the Cryptographic Transformation Means 36 uses the recovered key K to ENCIPHER some blocks of plaintext data which were passed in the cryptographic service request issued to the CF 4. The Control Vector Production Means 32 accepts the opcode 50 and mode parameter 52 and passes them to the Service Request Transformation Means 70 to construct a skeletal DATA COMPAT-INTERNAL control vector C'. The Service Request Transformation Means 70 applies the opcode 50 and mode 52 to a set of CASE statements to algorithmically select a set of executable statements which apply to the requested cryptographic transformation. In this case, the following statements are selected and executed:

| | |
|---|---|
| CASE opcode OF | /* Set Up opcode-specific Fields of Control Vector */ |
| 'ENCIPHER': | |
| | /* ENCIPHER-specific fields */ |
| CASE mode OF | |
| 'COMPAT': | |
| Set Bits 08 . . . 14 = B'0000000' | /* CV Type = Data Compat Key */ |
| Set Bits 18 . . . 21 = B'1111' | /* Usage = E,D,MG,MV */ |
| Set Bit 22 = B'0' | /* Reserved Bit */ |
| Set Bit 37 = B'0' | /* Software Bit = Unspecif'd */ |

The notations between brackets '/*' and '*/' are treated as comments; the comments list the name of the applicable CV field being modified on the left of the equals sign and the mnemonic value or values to which the field is being set. The reader will recall that the Service Request Transformation Means 70 may serve to generate those fields of the output CV C which are dependent on input parameters and CV type (as is the case in this example). The skeletal CV, C', is output from the Service Request Transformation Means 70. FIG. 8 illustrates the 64-bit CV C' as 8 hexadecimal bytes ('xx' denotes not-defined or unknown).

The skeletal CV C' is then input to the Control Vector Generation Function 74 of the Control Vector Production Means 32. The Control Vector Generation Function 74 then uses a Fixed CV Field Generator 76 to set, or "fix", the remaining parameter-independent fields of the CV. The reader will observe that in this example, these fields consist of some standard Reserved fields, some unused software bits, the extension bits, etc. It should be noted that some of these fields have been fixed in this implementation (such as Export Control and Key Form) but these may be considered parameter-dependent in other implementations depending on the functional and security requirements of the user. The output CV C'' consists of a fully-populated control vector containing the merged output fields of the Service Request Transformation Means 70 and the Fixed CV Field Generator 76. Finally, the CV C'' is even-parity-adjusted in the Adjust Even Parity component 80. (The reader will recall that each byte of the control vector contains a parity bit which must be set to ensure even-parity per byte.) The final CV C=X'00007D0003000000', which is a generic DATA COMPAT-INTERNAL CV type, is then output as control vector C 84 for storage in the Working Registers 38.

The reader will note that the Generation Method of CV Enforcement is characterized by the internal computation of control vectors from input parameters (such as opcode, mode, etc.), much like the Table Lookup Method. In the Generation Method, however, the fields of the CV may be constructed dynamically on the basis of an algorithm or tables, or both. Input CVs may also be used as templates from which to construct additional, functionally-related CVs. An example of this latter notion is described in FIG. 11 later in this description.

Figure 9:
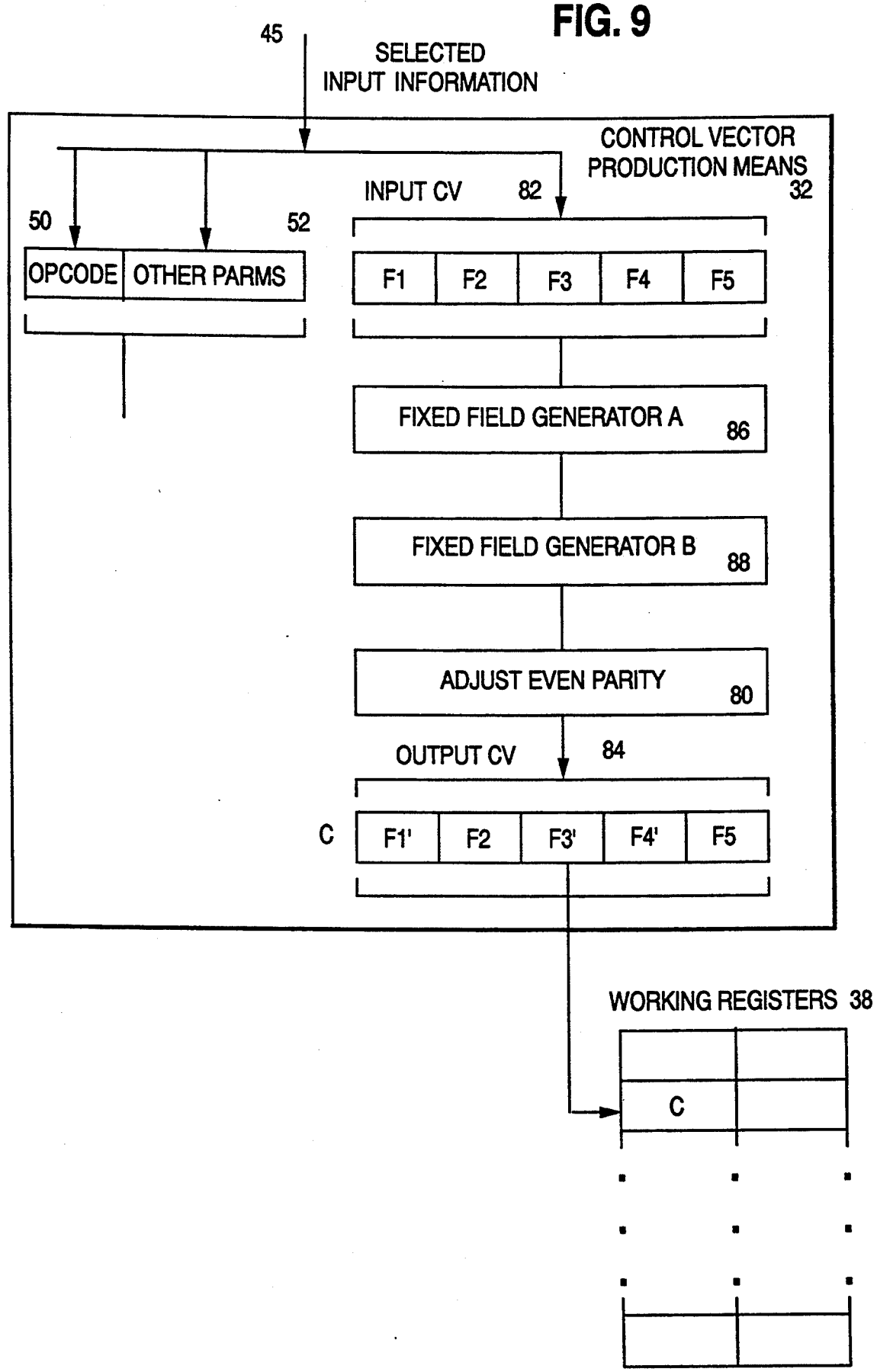
FIG. 9 describes still another method of CV enforcement in which the Control Vector Production Means accepts an input control vector and "fixes" (i.e., overlays or overrides) a set of fields with predetermined values on the basis of an input operation code and other input parameters supplied to the cryptographic facility in selected input information within a cryptographic service request.

FIG. 9 illustrates yet another method of CV Enforcement: the Field Fixing Method. This method uses a set of algorithmic or table-driven rules to override certain fields within a set of input CVs to ensure that CVs used in processing conform to a predetermined specification. In order to support implementation of user-defined fields, the Field Fixing Method only modifies those fields of the input CVs which must be modified in order to meet the defined specification. All other fields are passed through unmodified. Note that this method differs from the Table Lookup and Generation Methods, and is more like CV Checking (as described in the referenced co-pending patent applications) in the sense that CVs are maintained and passed by the user across the FAPI 20 with each cryptographic service request to CF 4. The present method differs from CV Checking in that, instead of testing the contents of CV fields (say that a field XYZ has value B'101'), the method simply forces the CV field to contain the requisite contents (by setting field XYZ to B'101', regardless of its previous contents). The process of force-setting the contents of a CV field to a predetermined value within the cryptographic facility is called "field-fixing," or just "fixing."

FIG. 9 shows a set of selected input information received on input channel 45 (from the Information Selection Means 30), including an opcode 50, an input control vector 82 with five distinguished fields F1, . . . ,F5, and other input parameters 52. Like the Generation Method described above, the Field Fixing Method is divided into two parts: 1) the fixing of fields based on input parameters and. 2) the fixing of fields independent of input parameters. The Fixed Field Generator A 86 accepts the input opcode 50, parameters 52, and input CV 82 and fixes a set of parameter-dependent fields within the input CV. The CV output from Fixed Field Generator A 86 is then passed to Fixed Field Generator B 88 in which certain parameter-independent CV fields may be fixed. Finally the CV output from the Fixed Field Generator B 88 is passed to the Adjust Even Parity component 80 for even-parity adjustment. The final control vector C 84 consists of some unmodified fields (say F2 and F5) from the original input CV 82 and a set of fixed fields (say F1', F3', and F4'); CV C 84 is then output to the Working Registers 38 for subsequent processing.

Figure 10A:
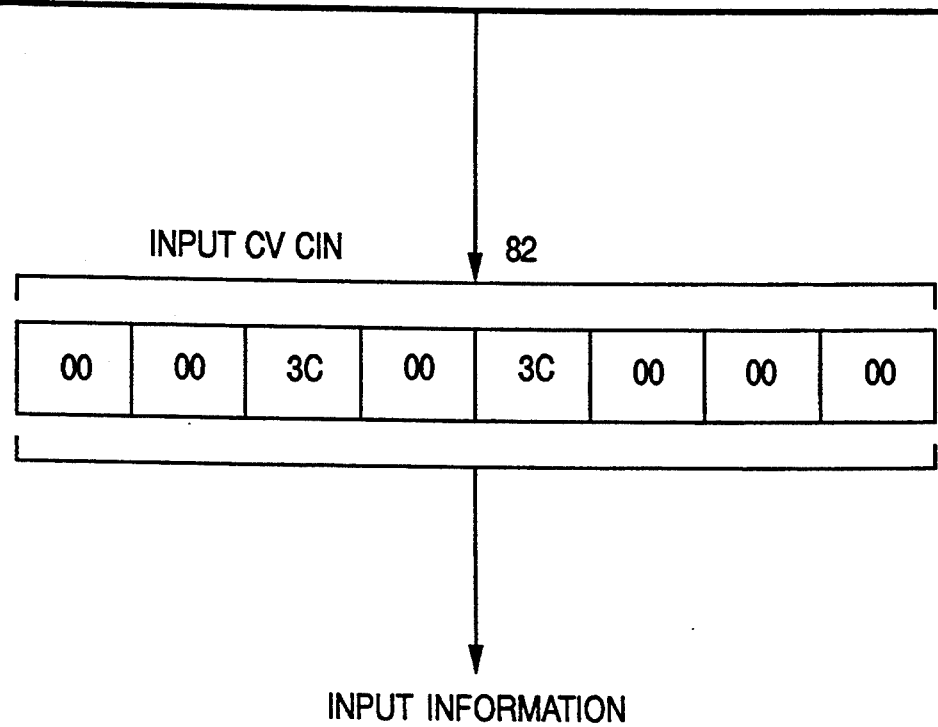
FIG. 10 gives an example of the method of CV field-fixing described in FIG. 9. In the example, a DATA COMPAT-INTERNAL control vector is produced from a "skeletal" input control vector containing a set of usage attributes for the user-definable fields. The Control Vector Production Means overlays the input control vector with a set of predetermined usage attributes for the non-user-definable (or, "fixed") fields.
Figure 10B:
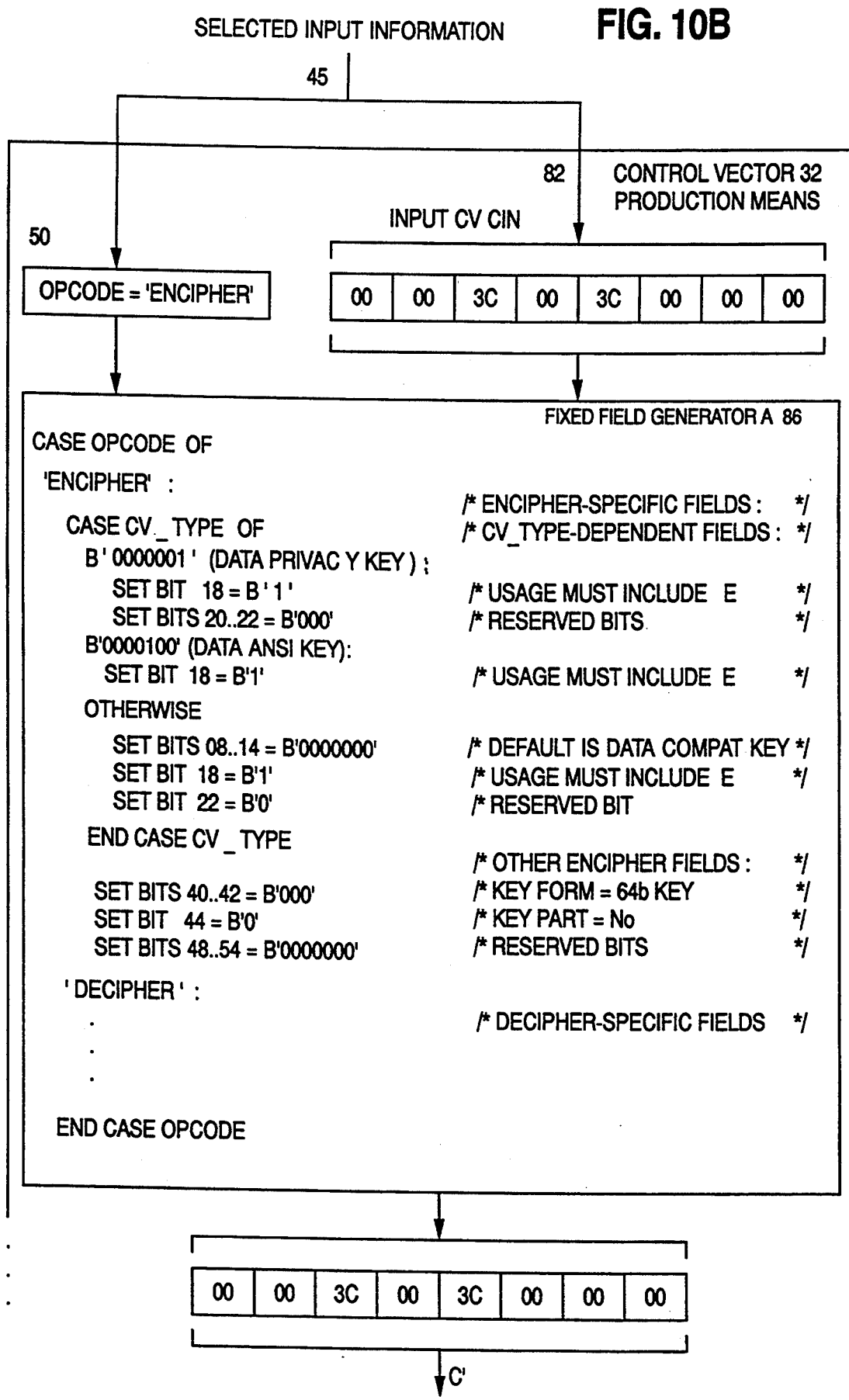
Figure 10C:
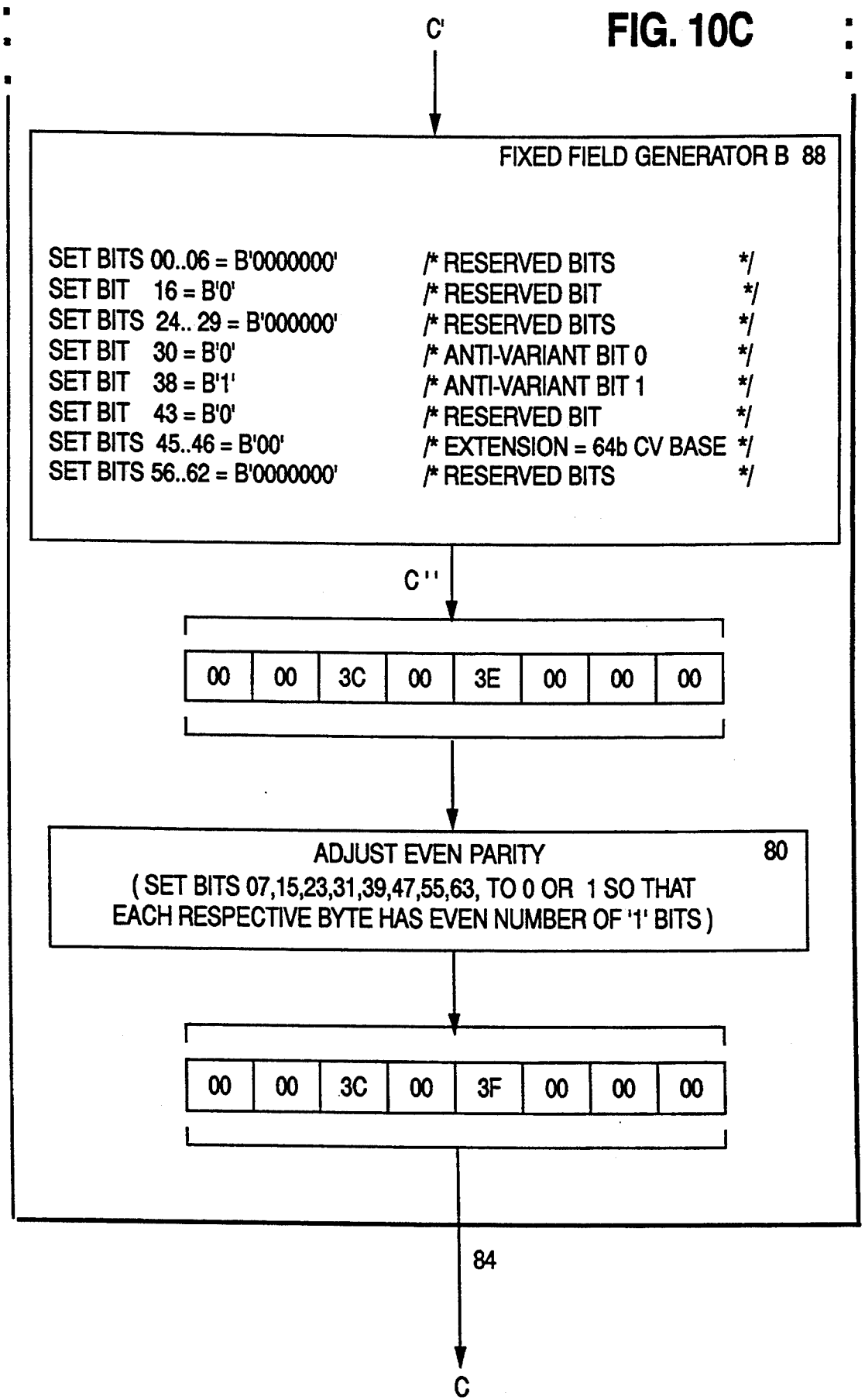

FIG. 10 shows an example of the Field Fixing Method of CV Enforcement. FIG. 10, Part 1 illustrates the construction of an input CV Cin 82 by a user outside the cryptographic facility, such as an application program APPL 8 or a Cryptographic Facility Access Program CFAP 6, as shown in FIG. 2. APPL 8 or CFAP 6 defines the contents of a set of variable fields within the control vector Cin; in particular, the APPL/CFAP sets the CV Type, Export Control, Key Usage, and some CFAP-enforced usage bits. In this example, the CFAP usage bits (bits 34 . . . 37 of Cin) require CFAP to prompt the key user for a password prior to using the associated key in a cryptographic service request. The CFAP usage bits also require that CFAP ensure that the key associated with this CV only be used on weekdays.

Other possible encodings for the CFAP usage bits might specify no-password-required or use-on-Fridays-only. Note that the enforcement of CFAP usage bits is shared by the CFAP (where the bits are tested) and the CF (where the bits are used in the CV to recover the associated key, thus ensuring the integrity of the key-CV association). The constructed control vector Cin=X'00003C003C000000' represents a skeletal CV in the sense that the CV is not completely specified and, therefore, is unusable within the CF 4. FIG. 10, Part 2 illustrates the Control Vector Production Means 32 which implements the Fixed Field Method of CV Enforcement. The user-constructed CV Cin is passed in a cryptographic service request through the CFAP 6 to the CF 4. The Control Vector Production Means 32 in turn accepts the opcode 'ENCIPHER' 50 and the control vector Cin 82 in selected input information 45 from the cryptographic service request. The input control vector Cin 82 is input to the Fixed Field Generator A 86 which uses the input opcode 50 to select a set of executable statements with which to fix the parameter-dependent fields of the input CV Cin. The opcode 50 equalling 'ENCIPHER' and the user-defined CV Type (bits 08 .. 14 of Cin) cause the following statements to be executed:

```
CASE opcode OF
'ENCIPHER':                              /* ENCIPHER-specific fields: */
  CASE CV_Type OF                        /* CV_Type-dependent fields: */
  OTHERWISE
    Set Bits 08 ... 14 = B'0000000'      /* Default is Data Compat Key */
    Set Bit 18 = B'1'                    /* Usage must include E */
    Set Bit 22 = B'0'                    /* Reserved Bit */
  END CASE CV_Type
                                         /* Other ENCIPHER fields: */
  Set Bits 40 ... 42 = B'000'            /* Key Form = 64b Key */
  Set Bit 44 = B'0'                      /* Key Part = No */
  Set Bits 48 ... 54 = B'0000000'        /* Reserved Bits */
```

The reader will note that this set of "rules" ensures for an ENCIPHER operation using a DATA COMPAT-INTERNAL key that the ENCIPHER Usage bit E is set (it already was in the input Cin), and that the key is 64 bits and not a key part. The reader will also observe in the rules of the Fixed Field Generator A 86 of FIG. 10, Part 2, for an ENCIPHER request that the CV Type of input CV Cin must be one of DATA PRIVACY, DATA ANSI, or DATA COMPAT-INTERNAL. Otherwise the CV Type itself is fixed to be the default, DATA COMPAT-INTERNAL. In this manner, the Control Vector Production Means 32 uses the Fixed Field Method to enforce the requirement that the ENCIPHER operation may only be performed on keys of these three types. The rules of Fixed Field Generator A 86 are split into two parts: 1) the CV Type-dependent rules and 2) the non-CV Type-dependent rules. The latter rules are only dependent on the input opcode 50 (such as Key Form, Key Part, etc.). The Fixed Field Generator A 86 passes the modified control vector C' to the Fixed Field Generator B 88. Note that C' in this example is the same as the user-defined input CV Cin; this is because Cin 82 satisfied all of the predetermined fixed field specifications for the opcode 'ENCIPHER' using a DATA COMPAT-INTERNAL key as input.

The Fixed Field Generator B 88 in turn executes a sequence of opcode-independent fixing rules to set the remaining, undefined fields of the CV C'. These fields may contain certain values which are common to all control vectors (such as the location and value of the Anti-variant bits) or to all control vectors in the current implementation (such as reserved bits and extension bits). The output of the Fixed Field Generator B 88 is a control vector C" which is input to the Adjust Even Parity component 80. The output from the Adjust Even Parity component is an even-parity-adjusted control vector C=X'00003C003F000000' which is then stored in the Working Registers 38 for further cryptographic processing.

The example of FIG. 10 illustrated the transformation of an input control vector Cin=X'00003C003C000000' to an output CV C=X'00003C003F000000'. The reader will note that unless the key K supplied in the ENCIPHER request is in fact encrypted using the latter CV C and not the user-supplied CV Cin, the CF 4 will not recover the key K correctly. Thus, a more likely application of the Field Fixing Method of CV Enforcement is where a user supplies the actual CV C with which its associated key K is encrypted. In this case, if C emerges unmodified from the Control Vector Production Means 32, then it satisfies the underlying rules of the Fixed Field Enforcement for the requested operation, and the key K will be successfully recovered within the CF 4. The advantage of the Fixed Field Method is that it permits enforcement of selected fields of the CV based on input parameters while still permitting user-definable fields. Still another advantage (as demonstrated in the example of FIG. 10) is only requiring the user to specify a few well-defined fields of the input CV; the remainder of the CV structure can be provided by the Fixed Field rules within the Control Vector Production Means 32 of the CF 4.

Figure 11A:
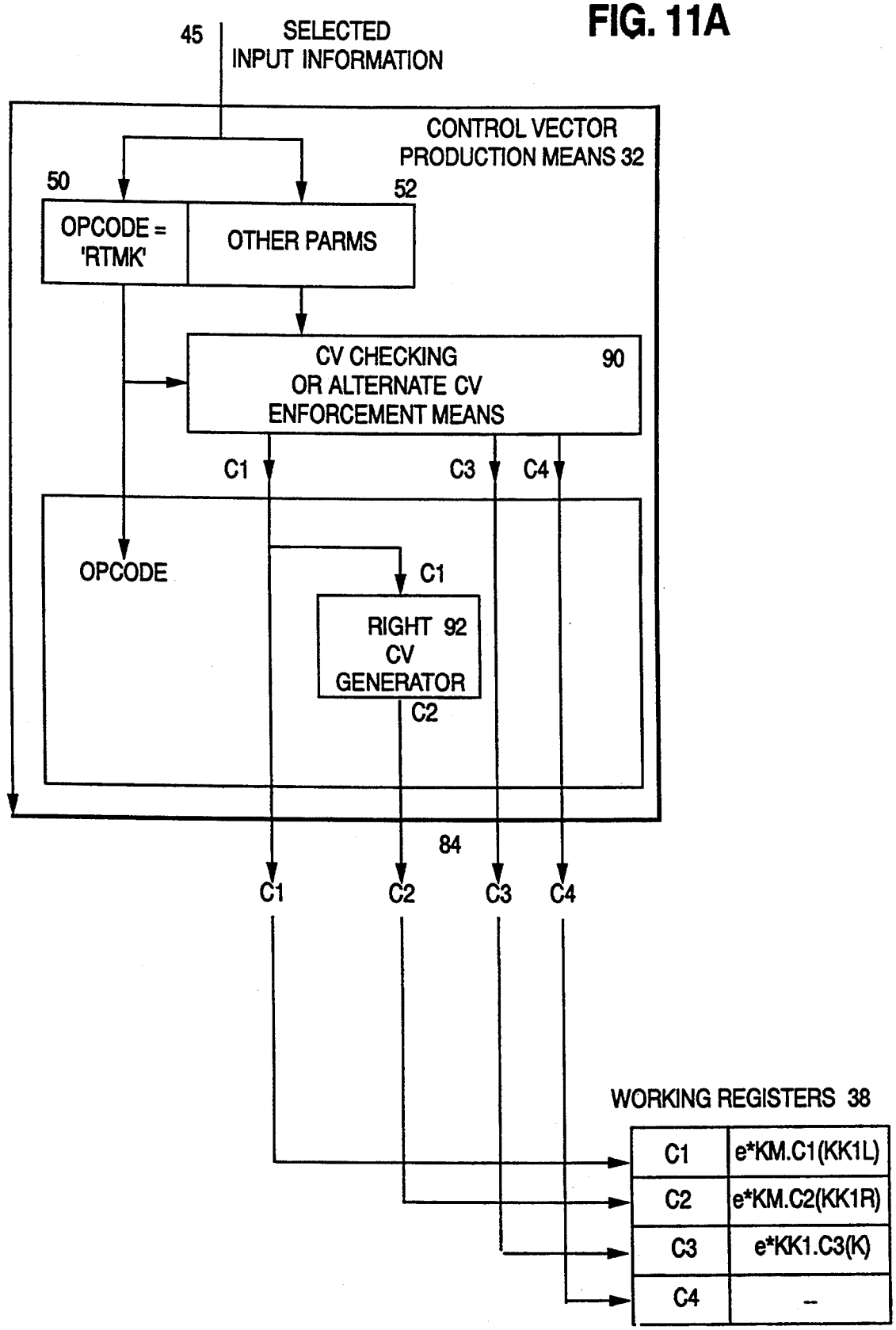
FIG. 11 illustrates an alternate embodiment of the CV generation method of CV enforcement in which one or more control vectors may be derived internally from input control vectors supplied to the cryptographic facility in a cryptographic service request. In the example provided in FIG. 11, the control vector associated with the right 64 bits of a 128-bit IMPORTER (key-encrypting) key is derived internally from an input control vector associated with the left 64 bits of the same 128-bit IMPORTER key.
Figure 11B:
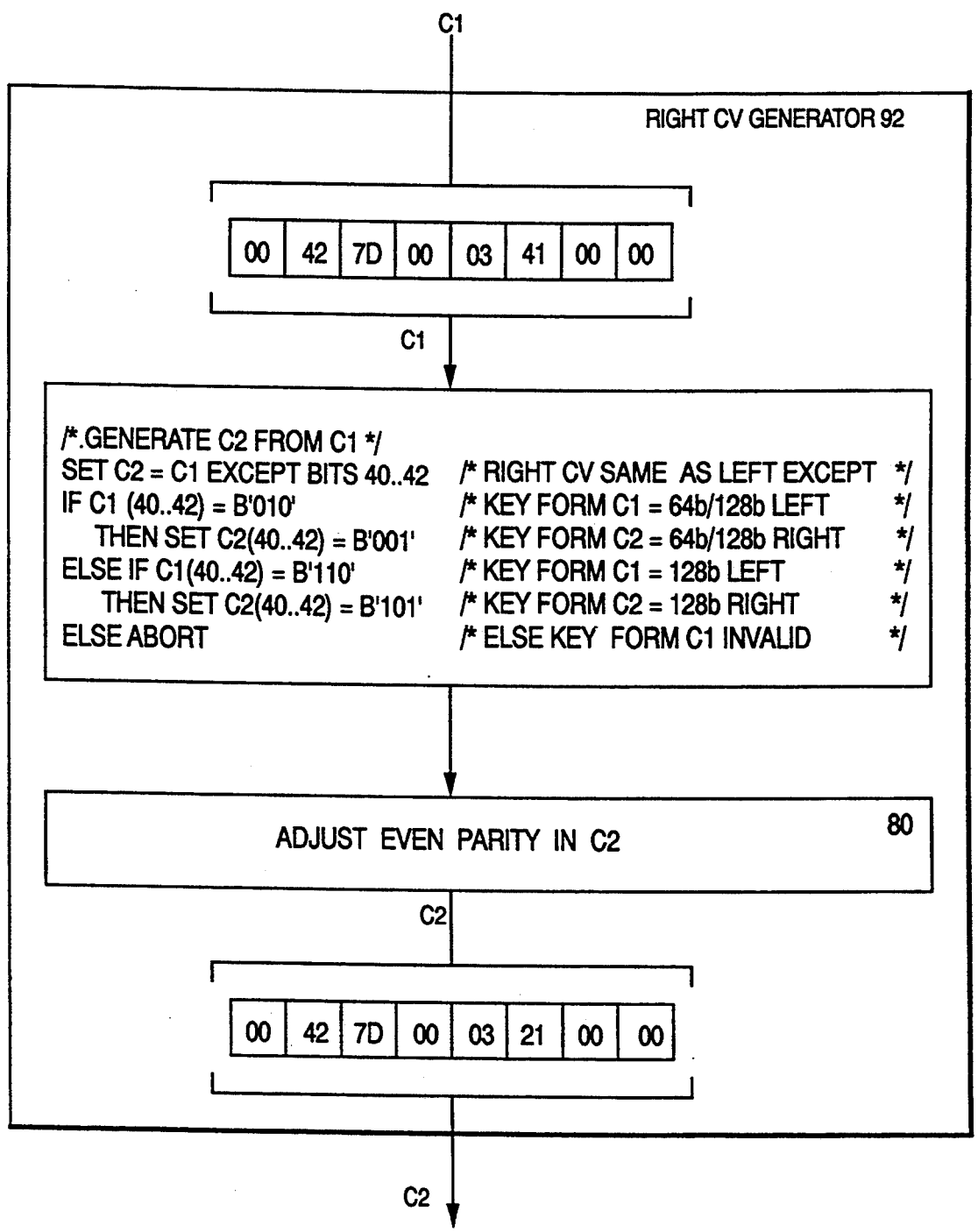

FIG. 11 illustrates a variation of the Generation Method of CV Enforcement in which a single control vector C1 is used to construct a functionally-related control vector C2. In particular, FIG. 11 describes a method of deriving the control vector C2 for the right 64-bit half KK1R of a 128-bit IMPORTER key (i.e., key-encrypting receiver key) KK from a supplied control vector C1 associated with the left 64-bit half KK1L of KK. Selected input information received on an input channel 45 from the Information Selection Means 30 (see FIG. 2) contains the service request opcode 50 'RTMK' and other input parameters 52. RTMK requests that a key K of the import form e*KK1.C3(K) (i.e., encrypted under an IMPORTER key) be transformed to the operational form e*KM.C4(K) (i.e., encrypted under the local master key KM). The left and right 64-bits of the IMPORTER key are supplied to the CF 4 instruction in the forms e*KM.Ci(KK1L) and e*KM.C2(KK1R), respectively.

The CVs C1, C3, and C4 may be passed to the Control Vector Production Means 32 as part of the other parameters 52, then checked using the CV Checking Method of CV Enforcement in the CV Checking Component 90. If the values pass the checking in the CV Checking Component 90, they are output directly to the Working Registers 38 for storage with their associated keys. (Note that C4 has no corresponding input key; C4 is used by the Cryptographic Transformation Means 36 to encrypt the recovered plaintext key K for output on output channel 14 to the requesting CFAP 6.) in the referenced co-pending patent applications, failure to pass CV checking results in aborting the operation. As another option the CVs C1, C3, and C4 may also be Generated, selected from Table Lookup, or Field Fixed from other parameter 52 inputs to the Control Vector Production Means 32 in the Alternate CV Enforcement Means 90. In any case, the CV C1 is also passed to a Right CV Generator 92 which translates the left-half CV C1 into a corresponding right-half CV C2. Both C1 and C2, as well as C3 and C4, are then output to their respective positions within the Working Registers 38.

FIG. 11, Part 2 shows the components and processing flow within the Right CV Generator 92. The input control vector C1 for key type IMPORTER (left half) (see FIG. 5), is modified in the Key Form bits as needed to derive the corresponding IMPORTER (right half) CV C2 for output. All bits other than the Key Form bits of C2 are identical to the bits of C1.

This variation of the Generation Method of CV Enforcement has the advantage that it reduces the number of redundant CVs that must be managed by the user outside the cryptographic facility. The present method is applicable to any CVs that have a fixed relationship (or one that may be parameterized in the other input parameters 52 to the Control Vector Production Means 32), such that a single CV may be mapped to additional CVs for use in satisfying a requested cryptographic service.

FIG. 12 illustrates a variation of the Table Lookup Method of CV Enforcement in which the Instruction Store 94 of the Cryptographic Transformation Means 36 includes a set of applicable control vectors for each defined instruction in the cryptographic facility instruction repertoire. The Instruction Store 94 contains storage for a set of executable routines; each routine contains the code necessary to process all or part of a single cryptographic facility instruction. The Instruction Processor 96 of the Cryptographic Transformation Means 36 fetches and executes the routine code from the Instruction Store 94 which corresponds to an opcode 50 received via channel 42 from the Information Selection Means 30 (see FIG. 2). The Instruction Processor 96 may also use other processing parameters 52 received in the selected input information received via channel 42 to fetch the appropriate executable code.

The Instruction Store 94 may also contain a set of predetermined control vectors C1, . . . ,Cn for each cryptographic instruction implemented in the Cryptographic Transformation Means 36. Thus the function of the Control Vector Production Means 32 of FIG. 2 to select one or more control vectors for use in processing a cryptographic service request alternatively may be implemented in the Cryptographic Transformation Means 36. The control vectors for each cryptographic instruction may be stored in tabular form within the code block associated with the instruction, or they may be grouped with other such CV tables in a common data block within the Instruction Store 94. In either case, the executable instructions of the Instruction Store 94 contain coded references to the location of each control vector Ci required to process the requested cryptographic instruction. The coded references may be in the form of indices to a common CV table stored in the Instruction Store 94; or, the references may be in the form of direct memory addresses to CVs imbedded as data items within the executable code block which is fetched and processed by the Instruction Processor 96 for a particular opcode 50.

The Instruction Processor 96 thus uses the opcode 50 to select a set of executable code and a set of control vectors C1, . . . ,Cn from the Instruction Store 94. The Instruction Processor 96 receives a set of keys K1, . . . ,Kn which correspond to the selected control vectors C1, . . . ,Cn via an input channel 46 from the Working Registers 38. The Instruction Processor 96 may then use the CVs and keys to recover encrypted keys into the clear, or to re-encrypt clear keys. The Instruction Processor 96 may also use keys or cryptovariables securely stored in clear form within the Cryptographic Transformation Means 36 (e.g., the system master key KM 98). For example, the Instruction Processor 96 may use a control vector C1 fetched from the Instruction Store 94 and the master key KM 98 to decrypt an encrypted data key in the form $e*KM.C1(K)$. The clear key K may then be used by the Instruction Processor to satisfy the requested cryptographic instruction, e.g., to encipher plaintext data with key K and output the resulting ciphertext via channel 14 to a requesting CFAP 6.

This variation of the Table Lookup Method of CV Enforcement has the advantage that the control vectors needed to process a cryptographic instruction may be stored along with the executable code which implements that instruction. The user of a cryptographic facility need not supply the control vectors to the instruction when making a request for cryptographic service: the CVs are selected by the Instruction Processor 96 on the basis of the requested opcode 50 and other input parameters 52. Thus the interface to the cryptographic facility is simplified. Furthermore, this frees the user from the burden of managing control vectors outside the cryptographic facility.

Although a specific embodiment of the invention has been disclosed, it will be understood by those having skill in the art that changes can be made to that specific embodiment without departing from the spirit and the scope of the invention.

What is claimed is:

1. In a data processing system executing a program which outputs cryptographic service requests to a cryptographic facility for operations with cryptographic keys which are associated with control vectors, each of said control vectors comprising one or more fields of predefined values which define the functions which the associated key is allowed by its originator to perform, apparatus for performing cryptographic operations within said cryptographic facility, comprising:

control vector production means, having an input channel for receiving input information comprising a cryptographic service request, for generating a control vector internally within said cryptographic facility and for providing said control vector at an output channel thereof in response to said cryptographic service request, said control vector having an associated key value; and cryptographic transformation means, having a first input channel for receiving said input information and a second input channel for receiving said control vector from said output channel of said control vector production means, for transforming said input information into output information using said control vector and said associated key value.

2. The apparatus of claim 1 wherein said input information includes a value encrypted under a key formed by a logical combination of a master key and said control vector.

3. The apparatus of claim 1 wherein said control vector production means further comprises:
means for storing said control vector and for outputting said control vector over said output channel of said control vector production means to said cryptographic transformation means in response to said cryptographic service request.

4. The apparatus of claim 1 wherein said control vector production means further comprises:
means for storing a table of control vectors accessible by an index value associated with said cryptographic service request, an accessed control vector therefrom being output from said control vector production means to said cryptographic transformation means in response to said cryptographic service request.

5. The apparatus of claim 1 wherein said control vector production means further comprises:
an instruction store for storing instructions to be output to said cryptographic transformation means for the execution of a requested cryptographic service, said instruction store including said control vector which is output to said cryptographic transformation means in response to said cryptographic service request.

6. The apparatus of claim 1 wherein said control vector production means further comprises:
service request transformation means, having an input channel for receiving the cryptographic service request supplied to said input channel of said control vector production means, for changing said cryptographic service request into a control vector which is output to said cryptographic transformation means in response to said cryptographic service request.

7. The apparatus of claim 1 wherein said cryptographic service request includes a first portion having fields with predetermined values and a second portion having fields with variable values, said control vector production means forming a control vector from said first portion and from said second portion and outputting the control vector to said cryptographic transformation means in response to said cryptographic service request.

8. The apparatus of claim 1 wherein said control vector includes a plurality of fields, each field having a respective predefined value.

9. The apparatus of claim 1 wherein said control vector production means selects a control vector from a set of defined control vectors and provides the selected control vector over said output channel in response to said service request.

10. The apparatus of claim 9 wherein said control vector production means stores said set of defined control vectors in a lookup table.

11. The apparatus of claim 9 wherein said control vector production means generates said control vector algorithmically.

12. The apparatus of claim 1, further comprising:
means responsive to said input information for generating said associated key value.

13. In a system in which a cryptographic facility receives cryptographic service requests originating from outside of said facility for operations with cryptographic keys which are associated with control vectors, each of said control vectors comprising one or more fields of predefined values which define the functions which the associated key is allowed by its originator to perform, apparatus for performing cryptographic operations within said cryptographic facility, comprising:
control vector production means for generating a control vector internally within said cryptographic facility as a function of input information comprising a cryptographic service request; and
key source means for generating an associated key value as a function of said input information; and
cryptographic transformation means for cryptographically transforming said input information using said generated control vector and associated key value.

14. In a system in which a cryptographic facility receives cryptographic service requests originating from outside of said facility for operations with cryptographic keys which are associated with control vectors, each of said control vectors comprising one or more fields of predefined values which define the functions which the associated key is allowed by its originator to perform, a method of performing cryptographic operations within said cryptographic facility, comprising the steps of:
generating a control vector internally within said cryptographic facility as a function of input information comprising a cryptographic service request;
generating an associated key value as a function of said input information; and
cryptographically transforming said input information using said generated control vector and associated key value.

* * * * *